(12) United States Patent
    Iseki (10) Patent No.: US 10,458,505 B2
(45) Date of Patent: Oct. 29, 2019

(54) CYLINDER ROD

(71) Applicant: KOMATSU LTD., Tokyo (JP)

(72) Inventor: Toshiyuki Iseki, Hirakata (JP)

(73) Assignee: KOMATSU LTD., Tokyo (JP)

( * ) Notice: Subject to any disclaimer, the term of this patent is extended or adjusted under 35 U.S.C. 154(b) by 281 days.

(21) Appl. No.: 15/527,638

(22) PCT Filed: Mar. 13, 2015

(86) PCT No.: PCT/JP2015/057538
§ 371 (c)(1),
(2) Date: May 17, 2017

(87) PCT Pub. No.: WO2016/147263
PCT Pub. Date: Sep. 22, 2016

(65) Prior Publication Data
US 2017/0335918 A1    Nov. 23, 2017

(51) Int. Cl.
*B22F 5/00*       (2006.01)
*F16F 9/32*       (2006.01)
(Continued)

(52) U.S. Cl.
CPC ............ *F16F 9/3221* (2013.01); *C22C 19/03* (2013.01); *C22C 19/05* (2013.01); *C22C 19/056* (2013.01); *C22C 29/02* (2013.01); *C23C 4/06* (2013.01); *C23C 4/10* (2013.01); *C23C 4/129* (2016.01); *F16F 9/3235* (2013.01); *F16J 7/00* (2013.01); *B22F 3/115* (2013.01); *B22F 2998/10* (2013.01); *B22F 2999/00* (2013.01); *C22C 29/06* (2013.01); *F16F 9/061* (2013.01); *F16F 2226/02* (2013.01); *F16F 2230/0023* (2013.01); (Continued)

(58) Field of Classification Search
None
See application file for complete search history.

(56) References Cited

U.S. PATENT DOCUMENTS 5,019,454 A * 5/1991 Busse ................. C23C 4/06
                                                428/570
5,326,645 A * 7/1994 Ashary ............... C23C 4/02
                                                427/419.2
(Continued)

FOREIGN PATENT DOCUMENTS

CN   2859104 Y   1/2007
EP   2 772 562 A1   9/2014
(Continued)

OTHER PUBLICATIONS

Jun. 16, 2015 International Search Report issued in International Patent Application No. PCT/JP2015/057538.

*Primary Examiner* — Seth Dumbris
(74) *Attorney, Agent, or Firm* — Oliff PLC (57) ABSTRACT

The cylinder rod of a hydraulic cylinder includes a body portion having a bar shape, and a head portion arranged at a longitudinal end of the body portion. The body portion has a coating formed on its outer peripheral surface. The coating includes, in terms of area ratio in cross section, not less than 56.1% and not more than 84.4% of a chromium carbide phase, with the remainder consisting of a nickel-based alloy phase and an oxide phase. The area ratio of the chromium carbide phase may be 61.7% or more.

3 Claims, 6 Drawing Sheets

(51) Int. Cl.
*C23C 4/06* (2016.01)
*C23C 4/10* (2016.01)
*C22C 19/03* (2006.01)
*C22C 19/05* (2006.01)
*C22C 29/02* (2006.01)
*F16J 7/00* (2006.01)
*C23C 4/129* (2016.01)
*B22F 3/115* (2006.01)
*C22C 29/06* (2006.01)
*F16F 9/06* (2006.01)

(52) U.S. Cl.
CPC ............. *Y10T 428/12056* (2015.01); *Y10T 428/12063* (2015.01); *Y10T 428/12576* (2015.01); *Y10T 428/12944* (2015.01)

(56) References Cited

U.S. PATENT DOCUMENTS

| | | | |
|---|---|---|---|
| 5,763,106 A | 6/1998 | Blanchard et al. | |
| 6,815,099 B1 * | 11/2004 | Zajchowski | F16J 15/3288 423/332 |
| 8,679,207 B2 * | 3/2014 | Amano | B23K 9/04 428/148 |
| 9,103,358 B2 * | 8/2015 | Killian | F15B 15/2861 |
| 2005/0051975 A1 * | 3/2005 | Takayama | C23C 4/06 277/650 |
| 2006/0191406 A1 * | 8/2006 | Kucher | F15B 15/2807 92/5 R |
| 2008/0292897 A1 * | 11/2008 | Ross | C23C 4/06 428/548 |
| 2010/0304181 A1 * | 12/2010 | Anand | C23C 4/12 428/627 |
| 2011/0312860 A1 | 12/2011 | Mathew et al. | |

FOREIGN PATENT DOCUMENTS

| | | |
|---|---|---|
| JP | H09-202957 A | 8/1997 |
| JP | 2002-335814 A | 11/2002 |
| JP | 2003-336743 A | 11/2003 |
| JP | 2005-105313 A | 4/2005 |
| JP | 2006-097875 A | 4/2006 |

* cited by examiner

CYLINDER ROD

TECHNICAL FIELD

The present invention relates to cylinder rods.

BACKGROUND ART

A cylinder rod constituting a hydraulic cylinder has its outer peripheral surface serving as a sliding surface. The outer peripheral surface of the cylinder rod is thus desired to have excellent sliding characteristics, wear resistance, etc. To meet such desires, a technique of applying chromium plating to the outer peripheral surface of a cylinder rod has been known (see, for example, Japanese Patent Application Laid-Open No. 2005-105313 (Patent Literature 1) and Japanese Patent Application Laid-Open No. 2006-97875 (Patent Literature 2)).

CITATION LIST

Patent Literature

Patent Literature 1: Japanese Patent Application Laid-Open No. 2005-105313
Patent Literature 2: Japanese Patent Application Laid-Open No. 2006-97875

SUMMARY OF INVENTION

Technical Problem

Cylinder rods used in harsher environments, however, may be desired to have higher wear resistance etc. exceeding the level obtainable by chromium plating. For example, a hydraulic cylinder for a work machine extends and retracts repeatedly in the environment where soil and sand as well as water may intrude. The cylinder rod is thus desired to have high wear resistance and high corrosion resistance. Further, when a hydraulic cylinder is used in such an environment, hard objects such as stones in the soil may hit against the cylinder rod. When a coating is formed on the outer peripheral surface of the cylinder rod, the coating is desired to have durability against hits of such hard objects.

One of the objects of the present invention is to provide a cylinder rod having formed thereon a coating excellent in wear resistance and corrosion resistance and also excellent in durability against hits of hard objects.

Solution to Problem

A cylinder rod according to the present invention is a cylinder rod of a hydraulic cylinder. This cylinder rod includes a body portion having a bar shape, and a head portion arranged at a longitudinal end of the body portion. The body portion has a coating formed on an outer peripheral surface thereof. The coating includes, in terms of area ratio in cross section, not less than 56.1% and not more than 84.4% of a chromium carbide phase, with the remainder consisting of a nickel-based alloy phase and an oxide phase.

The present inventors conducted investigations regarding a coating that is excellent in wear resistance and corrosion resistance and also excellent in durability against hits of hard objects, in order to improve the durability of the cylinder rod. As a result, they found that a coating including a chromium carbide phase and a nickel-based alloy phase would be able to meet the above desires. In consideration of wear resistance and corrosion resistance as well as durability against hits of hard objects, they have found that a configuration including, in terms of area ratio in cross section, not less than 56.1% and not more than 84.4% of the chromium carbide phase with the remainder consisting of the nickel-based alloy phase and an oxide phase would yield a coating that is excellent in wear resistance and corrosion resistance and also excellent in durability against hits of hard objects.

In the cylinder rod of the present invention, the coating is formed to cover the outer peripheral surface of the body portion. This coating includes, in terms of area ratio in cross section, not less than 56.1% and not more than 84.4% of the chromium carbide phase, with the remainder consisting of the nickel-based alloy phase and the oxide phase. Thus, according to the cylinder rod of the present invention, it is possible to provide a cylinder rod having formed thereon a coating that is excellent in wear resistance and corrosion resistance and also excellent in durability against hits of hard objects.

In the above-described cylinder rod, the area ratio of the chromium carbide phase may be 61.7% or more. With this configuration, the coating becomes more excellent in wear resistance and corrosion resistance and more excellent in durability against hits of hard objects.

In the above-described cylinder rod, the chromium carbide phase may be formed with stacked chromium carbide grains, and the nickel-based alloy phase and the oxide phase may fill interstices in the chromium carbide phase. The coating having such a structure becomes excellent in wear resistance and corrosion resistance and also excellent in durability against hits of hard objects.

Effects of the Invention

As is clear from the above description, according to the cylinder rod of the present invention, it is possible to provide the cylinder rod having formed thereon a coating that is excellent in wear resistance and corrosion resistance and also excellent in durability against hits of hard objects.

DESCRIPTION OF EMBODIMENTS

An embodiment of the present invention will now be described. In the following drawings, the same or corresponding parts are denoted by the same reference numerals, and the description thereof will not be repeated.

Figure 1:
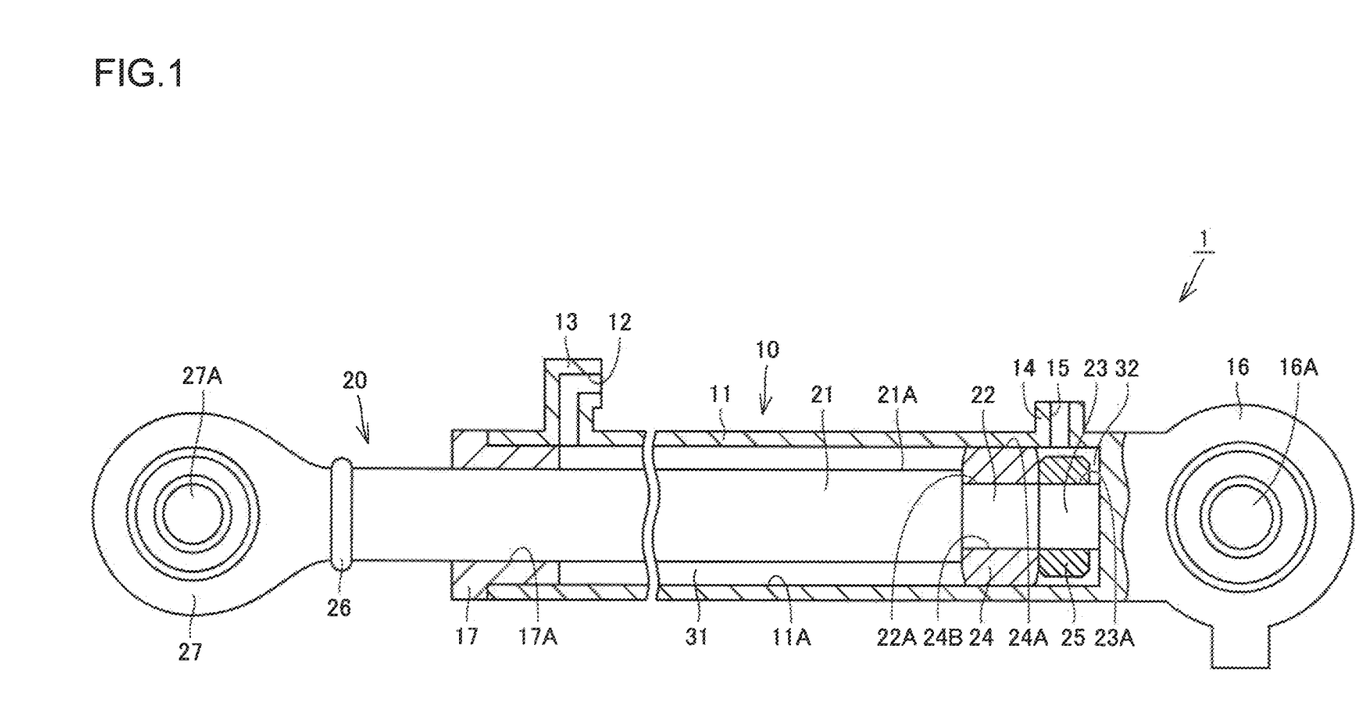
FIG. 1 is a schematic view showing the structure of a hydraulic cylinder.

FIG. 1 shows the structure of a hydraulic cylinder that includes a cylinder rod according to an embodiment of the present invention. Referring to FIG. 1, the hydraulic cylinder 1 includes: a cylinder rod 20, which includes a body portion 21 having a bar shape, or more particularly a cylindrical shape; and a cylinder 10, which includes a cylinder body portion 11 having a hollow cylindrical shape that surrounds an outer peripheral surface 21A of the body portion 21 of the cylinder rod 20.

The cylinder rod 20 includes the body portion 21 having the bar shape, and a head portion 27 which is a connecting portion arranged at a longitudinal end of the body portion 21. The head portion 27 has a connection hole 27A formed therein, which is a through hole for connecting the cylinder rod 20 with another part. The body portion 21 and the head portion 27 are joined at a joint portion 26. The body portion 21 and the head portion 27 are joined by welding, for example. The joint portion 26 is, for example, a welded joint formed by welding.

The body portion 21 has the other longitudinal end where a piston holding portion 22 and a screw portion 23 are formed. The piston holding portion 22 and the screw portion 23 are smaller diameter portions that are smaller in diameter than the remaining region of the body portion 21. As seen from the piston holding portion 22, the screw portion 23 is located on a side opposite to the head portion 27 side. A piston 24 is disposed in contact with an outer peripheral surface 22A of the piston holding portion 22. The piston 24 has a hollow cylindrical shape.

The piston 24 is fitted on the piston holding portion 22 in such a manner that an inner peripheral surface 24B of the piston 24 comes into contact with the outer peripheral surface 22A of the piston holding portion 22. The piston holding portion 22 penetrates through the piston 24. An outer peripheral surface 24A of the piston 24 is in contact with an inner peripheral surface 11A of the cylinder body portion 11 over the entire periphery. The piston 24 is slidable in the longitudinal direction of the cylinder rod 20 with respect to the inner peripheral surface 11A of the cylinder body portion 11. The screw portion 23 has its outer peripheral surface 23A formed with a helical groove. A nut 25 is screwed on the screw portion 23. The nut 25 serves to secure the piston 24 in the longitudinal direction of the cylinder rod 20.

The cylinder 10 includes the cylinder body portion 11 having a hollow cylindrical shape, a cylinder head 17 having a hollow cylindrical shape, arranged at a longitudinal end of the cylinder body portion 11, and a cylinder bottom 16 arranged at the other longitudinal end of the cylinder body portion 11. The cylinder bottom 16 has a connection hole 16A formed therein, which is a through hole for connecting the cylinder 10 with another part.

The cylinder head 17 has an inner diameter smaller than that of the cylinder body portion 11. The cylinder head 17 has an inner peripheral surface 17A that is in contact with the outer peripheral surface 21A of the body portion 21 of the cylinder rod 20 over the entire periphery. The body portion 21 of the cylinder rod 20 is slidable in the longitudinal direction of the cylinder rod 20 with respect to the inner peripheral surface 17A of the cylinder head 17.

The cylinder head 17 has an outer diameter that is smaller on the cylinder bottom 16 side in the longitudinal direction of the cylinder 10, as compared to the remaining region. The cylinder head 17 is fixedly secured to the cylinder body portion 11 in such a manner that the outer peripheral surface of the region having the smaller outer diameter comes into contact with the inner peripheral surface 11A of the cylinder body portion 11. The body portion 21 of the cylinder rod 20 penetrates through the cylinder head 17 and is inserted into the cylinder body portion 11.

On the outer peripheral surface of the cylinder body portion 11, a first oil inlet 13 is formed, which defines a first oil passage 12 that is a through hole radially penetrating the cylinder body portion 11. The first oil passage 12 communicates with a first oil chamber 31, which is a space between the outer peripheral surface 21A of the body portion 21 of the cylinder rod 20 and the inner peripheral surface 11A of the cylinder body portion 11, and is a region sandwiched between the cylinder head 17 and the piston 24.

On the outer peripheral surface of the cylinder body portion 11, a second oil inlet 14 is formed, which defines a second oil passage 15 that is a through hole radially penetrating the cylinder body portion 11. The second oil passage 15 communicates with a second oil chamber 32, which is a region located on a side of the piston 24 opposite to the cylinder head 17 side in the longitudinal direction of the cylinder rod 20, and is surrounded by the inner wall surface of the cylinder body portion 11.

The first oil inlet 13 and the second oil inlet 14 are connected to corresponding hydraulic hoses (not shown). This allows hydraulic oil to be supplied to the first oil chamber 31 and the second oil chamber 32, and also to be discharged from the first oil chamber 31 and the second oil chamber 32, through the first oil passage 12 and the second oil passage 15, respectively.

When the hydraulic oil is supplied to the second oil chamber 32 through the second oil passage 15, the hydraulic pressure causes the piston 24 to move toward the cylinder head 17. As a result, the distance between the head portion 27 of the cylinder rod 20 and the cylinder bottom 16 of the cylinder 10 increases, so the hydraulic cylinder 1 attains an extended state. At this time, the hydraulic oil in the first oil chamber 31 is discharged through the first oil passage 12.

When the hydraulic oil is supplied to the first oil chamber 31 through the first oil passage 12, the hydraulic pressure causes the piston 24 to move away from the cylinder head 17. As a result, the distance between the head portion 27 of the cylinder rod 20 and the cylinder bottom 16 of the cylinder 10 decreases, so the hydraulic cylinder 1 attains a retracted state. At this time, the hydraulic oil in the second oil chamber 32 is discharged through the second oil passage 15.

Figure 2:
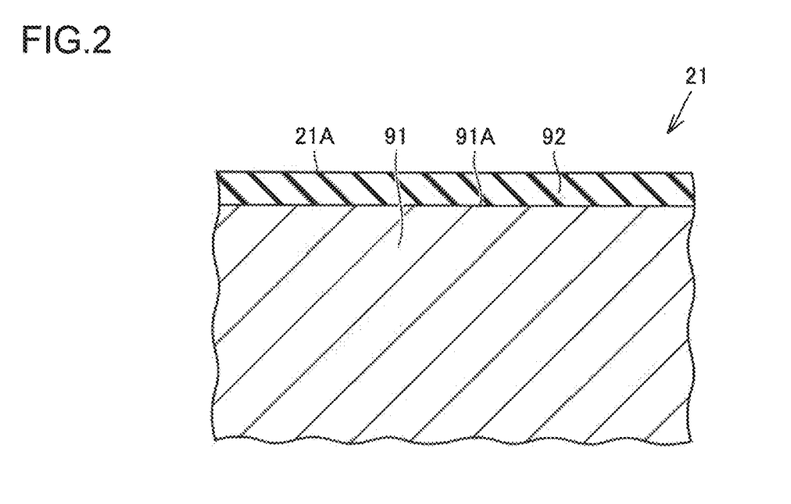
FIG. 2 is a schematic cross-sectional view showing the structure of a cylinder rod in the vicinity of the surface of the rod.

FIG. 2 is a schematic cross-sectional view of the body portion 21 of the cylinder rod 20 near its outer peripheral surface 21A, showing a cross section perpendicular to the outer peripheral surface 21A in an enlarged view. Referring to FIG. 2, the body portion 21 of the cylinder rod 20 has a coating 92 formed to cover the outer peripheral surface 21A. The body portion 21 of the cylinder rod 20 includes a base portion 91 made of steel and having a bar shape, and the coating 92 formed on an outer peripheral surface 91A of the base portion 91. The coating 92 includes, in terms of area ratio in the cross section perpendicular to the outer peripheral surface 21A, not less than 56.1% and not more than 84.4% of a chromium carbide ($Cr_3C_2$) phase, with the remainder consisting of a nickel-based alloy phase and an oxide phase.

With this, the cylinder rod 20 according to the present embodiment becomes a cylinder rod having the coating 92 that is excellent in wear resistance and corrosion resistance and also excellent in durability against hits of hard objects.

The nickel-based alloy constituting the nickel-based alloy phase may be, for example, one that contains not less than 26% by mass and not more than 30% by mass of molybdenum and not less than 2% by mass and not more than 8% by mass of iron, with the remainder consisting of nickel and unavoidable impurities, or one that contains not less than 13% by mass and not more than 20% by mass of molybdenum, not less than 13% by mass and not more than 18% by mass of chromium, not less than 2% by mass and not more than 8% by mass of iron, and not less than 2% by mass and not more than 5% by mass of tungsten, with the remainder consisting of nickel and unavoidable impurities.

The nickel-based alloy constituting the nickel-based alloy phase may be, for example, one that contains not less than 14% by mass and not more than 17% by mass of chromium and not less than 5% by mass and not more than 10% by mass of iron, with the remainder consisting of nickel and unavoidable impurities.

The nickel-based alloy constituting the nickel-based alloy phase may be, for example, one that contains not less than 14% by mass and not more than 17% by mass of chromium and not less than 5% by mass and not more than 10% by mass of iron, with the remainder consisting of nickel and unavoidable impurities, or one that contains not less than 14% by mass and not more than 17% by mass of chromium and not less than 5% by mass and not more than 10% by mass of iron, and further contains at least one selected from the group consisting of: not less than 2% by mass and not more than 3% by mass of titanium, not less than 0.4% by mass and not more than 1% by mass of aluminum, and not less than 0.7% by mass and not more than 1.2% by mass in total of at least one of niobium and tantalum, with the remainder consisting of nickel and unavoidable impurities.

The nickel-based alloy constituting the nickel-based alloy phase may be, for example, one that contains not less than 20% by mass and not more than 23% by mass of chromium and not less than 8% by mass and not more than 10% by mass of molybdenum, with the remainder consisting of nickel and unavoidable impurities, or one that contains not less than 20% by mass and not more than 23% by mass of chromium and not less than 8% by mass and not more than 10% by mass of molybdenum, and further contains not less than 3% by mass and not more than 4.5% by mass in total of at least one of niobium and tantalum, and not more than 5% by mass of iron, with the remainder consisting of nickel and unavoidable impurities.

The oxide constituting the oxide phase is oxide(s) of the element(s) constituting the nickel-based alloy. For the steel constituting the base portion 91, for example, carbon steel for machine structural use or alloy steel for machine structural use can be adopted. The steel constituting the base portion 91 is, for example, JIS S45C. The steel constituting the base portion 91 has undergone quench hardening.

The area ratio of the chromium carbide phase in the cross section of the coating 92 may be 61.7% or more. With this, the coating 92 becomes more excellent in wear resistance and also excellent in durability against hits of hard objects.

The cylinder rod 20 of the present embodiment is suitable as a cylinder rod of a hydraulic cylinder used in the environment where soil and sand as well as water exist. The cylinder rod 20 is suitable as a cylinder rod of a hydraulic cylinder for a work machine, which is used for driving, for example, a steering rod of a dump truck, a suspension in a dump truck, a bucket of a hydraulic excavator, etc.

Figure 3:
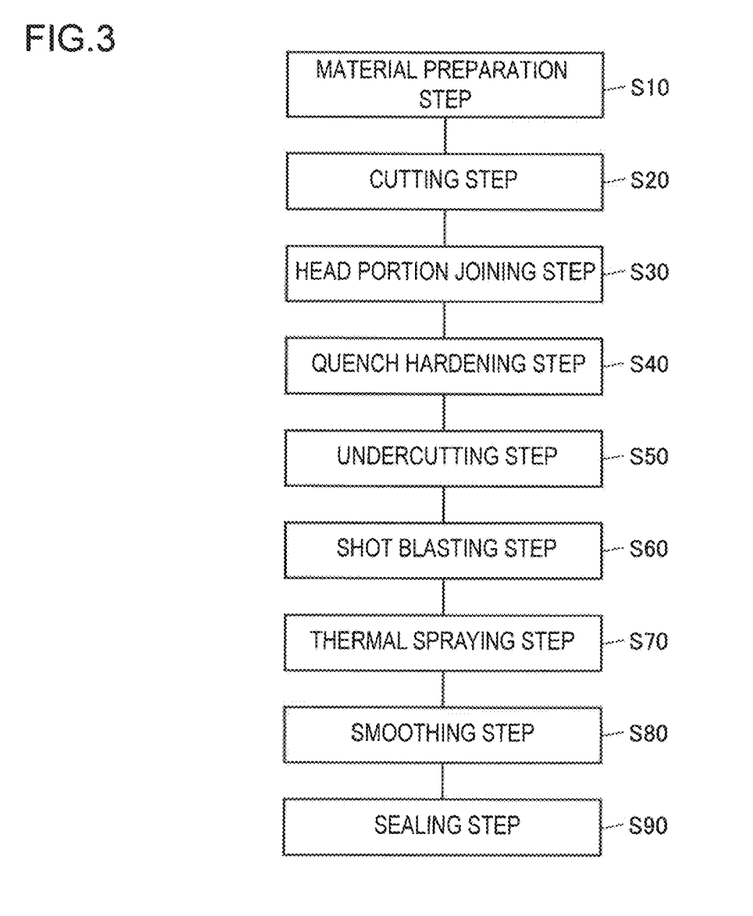
FIG. 3 is a flowchart schematically illustrating a method for producing a cylinder rod.

An exemplary method for producing the cylinder rod 20 of the present embodiment will now be described. FIG. 3 is a flowchart schematically illustrating the method for producing a cylinder rod. Referring to FIG. 3, in the method for producing the cylinder rod 20 in the present embodiment, initially, a material preparation step is carried out as a step S10. In this step S10, a bar of S45C, which is a carbon steel for machine structural use, is prepared as a material.

Next, a cutting step is carried out as a step S20. In this step S20, the bar prepared in the step S10 is cut. Specifically, referring to FIG. 1, the prepared bar is cut into a length appropriate for the body portion 21 of the cylinder rod 20. On one end of the body portion 21, a piston holding portion 22 and a screw portion 23 are formed.

Next, a head portion joining step is carried out as a step S30. In this step S30, on an end of the body portion 21 opposite to the end where the piston holding portion 22 and the screw portion 23 have been formed in the step S20, a head portion 27, prepared separately, is joined by welding, for example.

Next, a quench hardening step is carried out as a step S40. In this step S40, the body portion 21 with the head portion 27 joined in the step S30 is subjected to quench hardening. The quench hardening can be performed by induction hardening, for example. Following the quench hardening, tempering is performed at an appropriate temperature. With this, the body portion 21 having its hardness adjusted to an appropriate level is obtained.

Next, an undercutting step is carried out as a step S50. In this step S50, a portion of the body portion 21 including its outer peripheral surface 21A corresponding to the region where a coating 92 is to be formed in a step S70, as will be described later, is cut and removed, whereby the body portion 21 is decreased in diameter in the relevant region. Although this step S50 is not an indispensable step, when performed, it facilitates adjustment of the diameter of the body portion 21 after spraying.

Next, a shot blasting step is carried out as a step S60. In this step S60, shot blasting is performed on the outer peripheral surface 21A of the body portion 21 corresponding to the region where the coating 92 is to be formed in the step S70 described later. This increases the surface roughness of the outer peripheral surface 21A of the body portion 21. Although this step S60 is not an indispensable step, when performed, it can prevent the coating 92, formed by spraying in the step S70 described later, from peeling off the base portion 91.

Next, a thermal spraying step is carried out as a step S70. In this step S70, thermal spraying is carried out to form a coating 92 so as to cover the outer peripheral surface 21A of the body portion 21 (or, the outer peripheral surface 91A of the base portion 91). Thermal spraying can be performed by high velocity oxygen fuel (HVOF) spraying, for example.

For the spraying material, powder (spraying powder) obtained by adding the above-described nickel-based alloy as a binder to chromium carbide powder can be used. The nickel-based alloy described above can be added to the spraying powder in an amount of not less than 15.9% by mass and not more than 68.6% by mass.

For the spraying powder, powder containing not less than 15.9% by mass and not more than 68.6% by mass of the above-described nickel-based alloy, with the remainder consisting of chromium carbide, can be adopted. When HVOF spraying is performed using this spraying powder, the coating 92 is formed as a sprayed film that contains chromium carbide and nickel-based alloy, with the nickel-based alloy partially oxidized.

The coating 92 that includes, in terms of area ratio in a cross section perpendicular to the outer peripheral surface 21A, not less than 56.1% and not more than 84.4% of the chromium carbide ($Cr_3C_2$) phase, with the remainder consisting of the nickel-based alloy phase and the oxide phase, is formed to cover the outer peripheral surface 21A. It is preferable that the flame for the HVOF spraying is a reducing flame (including the state of complete combustion). This facilitates adjustment of the area ratio of the oxide phase to an appropriate range (of 16.2% or less).

Next, a smoothing step is carried out as a step S80. In this step S80, the surface of the coating 92 formed in the step S70 is smoothed. For example, the coating 92 is subjected to grinding and super finishing. The grinding can be performed using, for example, a diamond wheel (grinding wheel with diamond grains arranged on the grinding surface). The super finishing can be performed using, for example, a diamond film (polishing film with diamond grains arranged on the surface).

Next, a sealing step is carried out as a step S90. In this step S90, the coating 92 with its surface smoothed in the step S80 is subjected to sealing. The sealing can be performed using a sealer made up, for example, of inorganic polymer. For the inorganic polymer, alkoxysilane polymer, for example, can be adopted.

Thereafter, referring to FIG. 1, the piston 24 is attached to the piston holding portion 22 and secured by the nut 25, whereby the cylinder rod 20 according to the present embodiment is completed. The cylinder rod 20 can further be combined with a separately prepared cylinder 10, whereby the hydraulic cylinder 1 according to the present embodiment is obtained.

Example 1

Coating samples were formed in a similar manner as in the production method described in the above embodiment, and an experiment was conducted to examine the durability of the coatings. The experiment was carried out as follows. Base members of S45C, each having a rectangular surface of 50 mm by 10 mm, were prepared, which were subjected to quenching and tempering to adjust the surface hardness to 50 HRC or higher. The surface roughness was made to be 3.2 s. On the respective surfaces, coatings were formed by HVOF spraying, as in the step S70 in the above embodiment, to thereby obtain samples.

The nickel-based alloy included in the spraying powder was one containing not less than 13% by mass and not more than 20% by mass of molybdenum, not less than 13% by mass and not more than 18% by mass of chromium, not less than 2% by mass and not more than 8% by mass of iron, and not less than 2% by mass and not more than 5% by mass of tungsten, with the remainder consisting of nickel and unavoidable impurities.

The ratios of the nickel-based alloy were set to be 15.9% by mass, 26.5% by mass, 31.8% by mass, 37.1% by mass, 52.8% by mass, and 68.6% by mass (Examples A, B, C, D, E, and F).

For comparison, samples were also prepared with coatings formed by chromium plating on surfaces of similar base members. The thicknesses of the coatings were made to be 40 μm, 100 μm, and 200 μm (Comparative Examples A, B, and C). The samples of the Examples and Comparative Examples were each fixedly secured such that the coating surface would be tilted 45° with respect to the vertical direction, and a steel ball having a diameter of 20 mm was freely dropped to hit the surface. A limit drop height (limit height) with which the coating would not suffer any cracks or deformation was examined.

For each sample of the Examples, the coating was cut in a plane perpendicular to the surface, and the area ratios of the chromium carbide ($Cr_3C_2$) phase, the oxide phase, and the nickel (Ni)-based alloy phase in the cross section were examined. The surface hardness (micro-Vickers hardness) of the coating was also measured. The examination results are shown in Table 1 and in FIGS. 4 to 8.

TABLE 1

| | Area Ratio of $Cr_3C_2$ Phase (%) | Area Ratio of Oxide Phase (%) | Area Ratio of Ni-based Alloy Phase (%) | Thickness of Cr Plating Layer (μm) | Limit Height (cm) | Hardness (Hv) |
|---|---|---|---|---|---|---|
| Example A | 84.4 | 5.2 | 10.4 | — | 120 | 838 |
| Example B | 73.9 | 12.6 | 13.5 | — | 145 | 921 |
| Example C | 61.7 | 16.2 | 22.1 | — | 90 | 885 |
| Example D | 61.8 | 12.6 | 25.6 | — | 80 | 840 |
| Example E | 57.4 | 7.5 | 35.1 | — | 75 | 776 |
| Example F | 56.1 | 6.3 | 37.6 | — | 60 | 615 |
| Comparative Example A | — | — | — | 40 | 15 | — |
| Comparative Example B | — | — | — | 100 | 20 | — |
| Comparative Example C | — | — | — | 200 | 60 | — |

Figure 4:
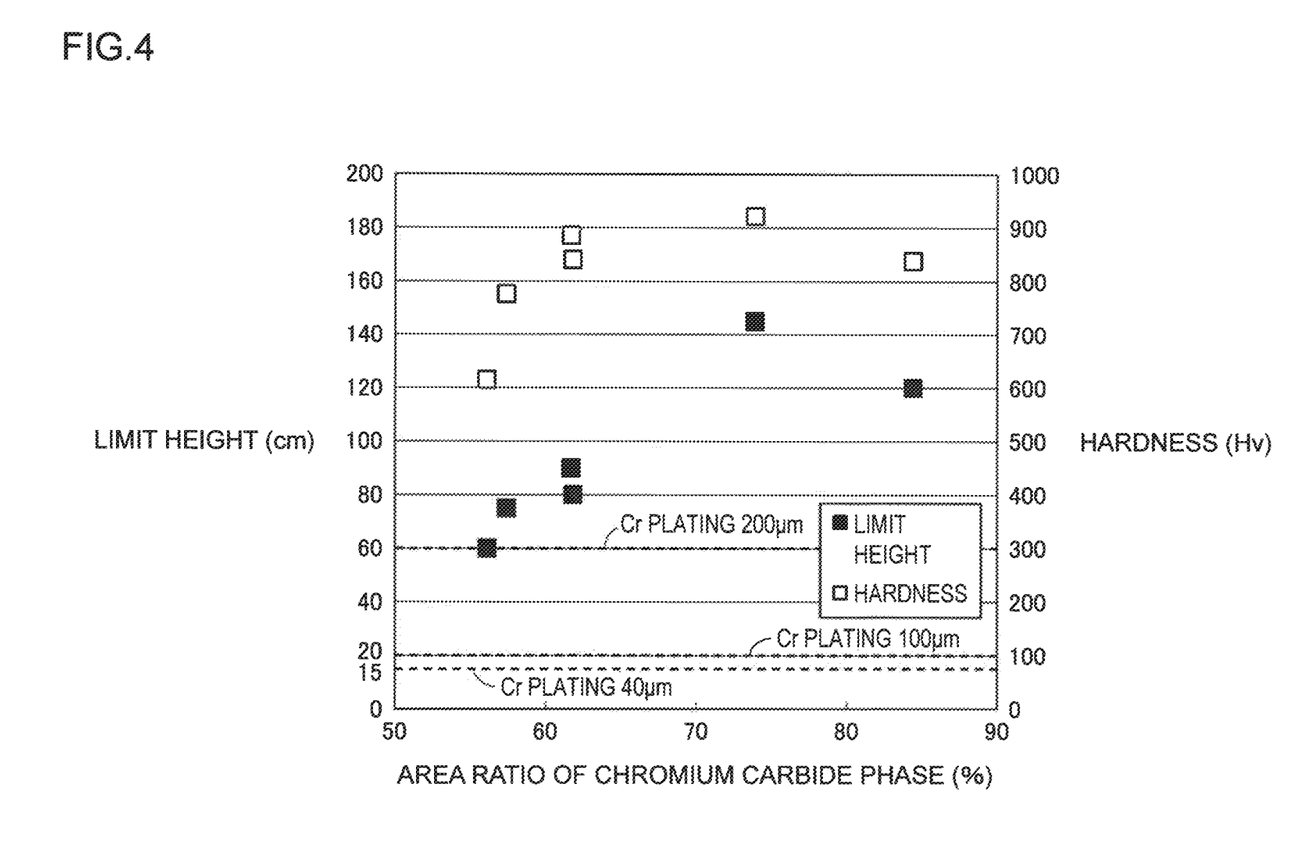
FIG. 4 is a diagram showing relations between the area ratio of a chromium carbide phase on one hand and a limit height and hardness on the other hand.
Figure 5:
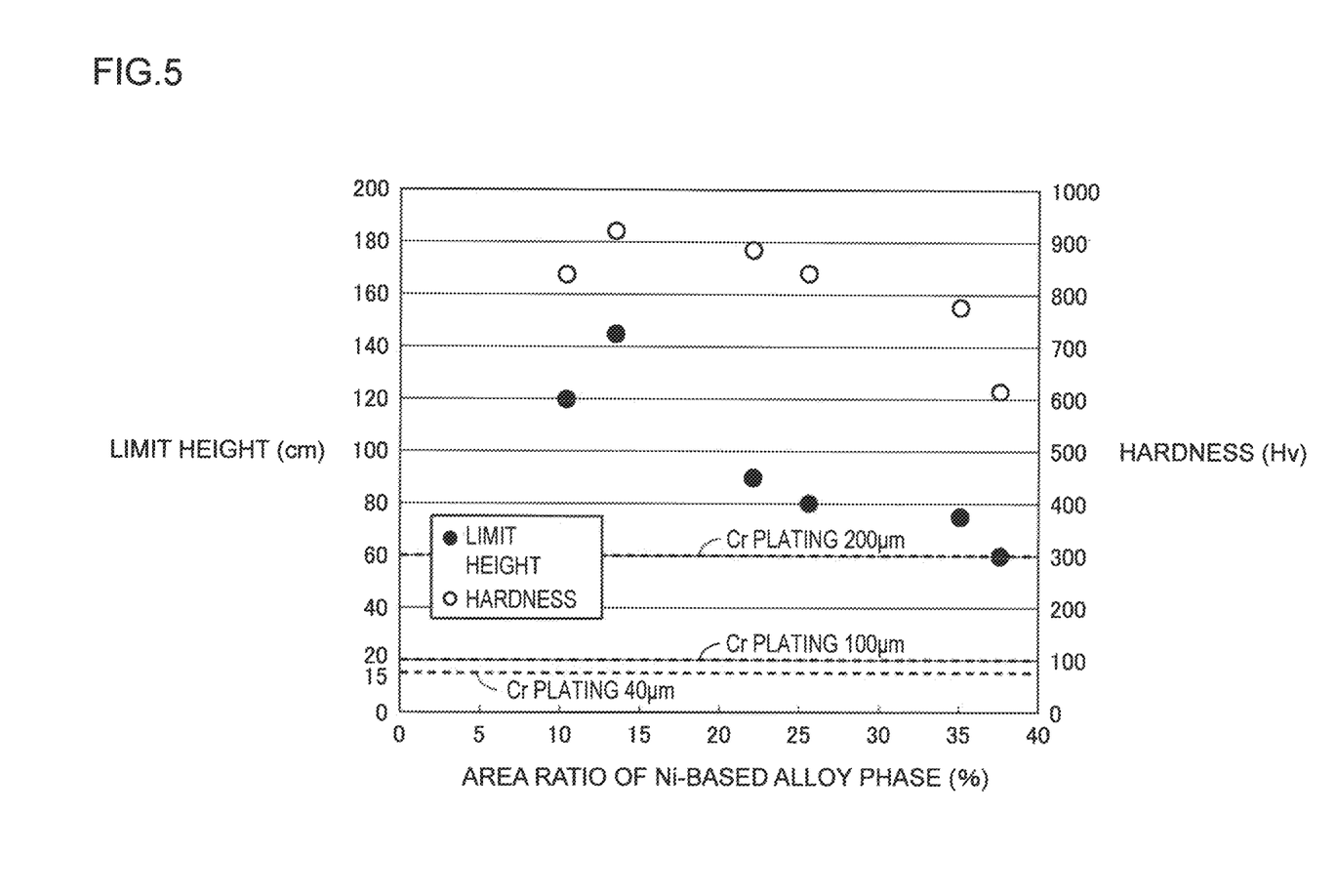
FIG. 5 is a diagram showing relations between the area ratio of a nickel-based alloy phase on one hand and a limit height and hardness on the other hand.

In FIG. 4, the horizontal axis represents the area ratio of the chromium carbide phase. In FIG. 5, the horizontal axis represents the area ratio of the nickel-based alloy phase. In FIGS. 4 and 5, the vertical axis represents the limit height and the hardness.

The broken lines in FIGS. 4 and 5 indicate the limit heights for Comparative Examples A, B, and C, having the chromium plating formed with the thicknesses of 40 μm, 100 μm, and 200 μm, respectively. Referring to FIGS. 4 and 5 as well as Table 1, the limit height increases with increasing area ratio of the chromium carbide phase and with decreasing area ratio of the nickel-based alloy phase.

On the other hand, in the Comparative Examples applied with chromium plating, the limit height increases with increasing thickness of the chromium plating. The 200 μm-thick chromium plating corresponds to so-called thick chromium plating. In any of Examples A to F, the limit height obtained is higher than that of Comparative Example C corresponding to the thick chromium plating.

Further, referring to FIG. 4, it is considered that the limit height becomes lower than that of the thick chromium plating when the area ratio of the chromium carbide phase becomes less than 56.1%.

From this, it can be said that in order to obtain the limit height not lower than that of the thick chromium plating, the area ratio of the chromium carbide phase should be 56.1% or more (that the area ratio of the nickel-based alloy phase should be 37.6% or less; see FIG. 5).

On the other hand, it is difficult to make the area ratio of the chromium carbide phase exceed 84.4% because the ratio of the nickel-based alloy, serving as the binder of the spraying powder, will become too small, making it difficult to produce the spraying powder. It can thus be said that it is reasonable to set the area ratio of the chromium carbide phase to be 84.4% or less (the area ratio of the nickel-based alloy phase to be 10.4% or more).

Further, referring to FIGS. 4 and 5, it is recognized that setting the area ratio of the chromium carbide phase to be 61.7% or more (the area ratio of the nickel-based alloy phase to be 16.2% or less) makes it possible to obtain a distinctively higher limit height as compared to the thick chromium plating and also obtain higher hardness.

Figure 6:
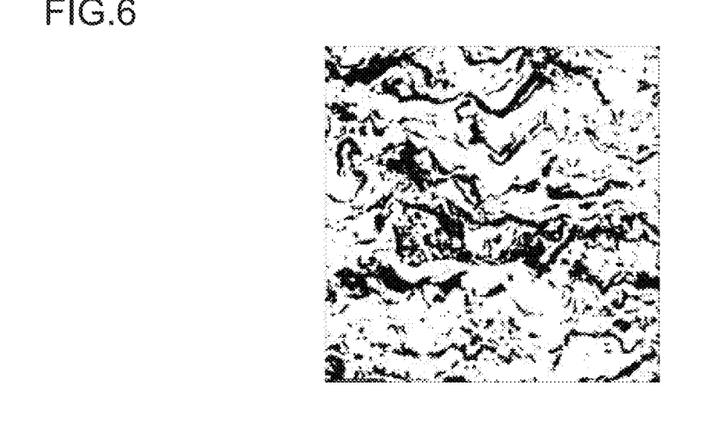
FIG. 6 is an EPMA image showing distribution of the chromium carbide phase in a cross section of an overlay.
Figure 7:
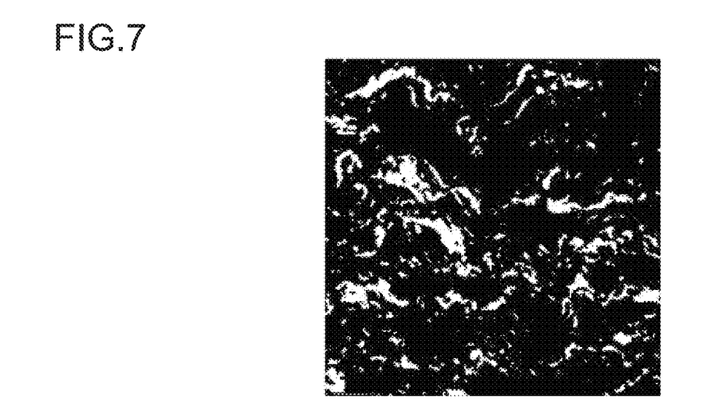
FIG. 7 is an EPMA image showing distribution of an oxide phase in the cross section of the overlay.
Figure 8:
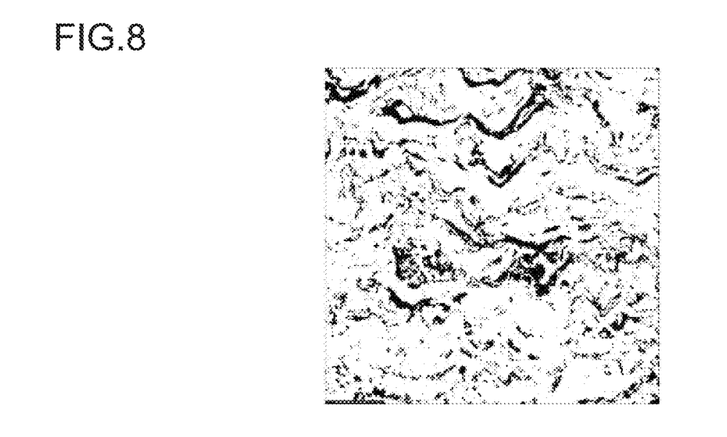
FIG. 8 is an EPMA image showing distribution of the nickel-based alloy phase in the cross section of the overlay.

FIGS. 6, 7, and 8 are electron probe micro analysis (EPMA) images, binarized into black and white, of a cross section perpendicular to the surface of the coating of Example B. The portions looking white in FIG. 6 correspond to the chromium carbide phase, the portions looking white in FIG. 7 correspond to the oxide phase, and the portions looking black in FIG. 8 correspond to the nickel-based alloy phase. Referring to FIGS. 6 to 8, the coating has a structure in which the interstices in the chromium carbide phase are filled with the nickel-based alloy phase and the oxide phase.

Figure 9:
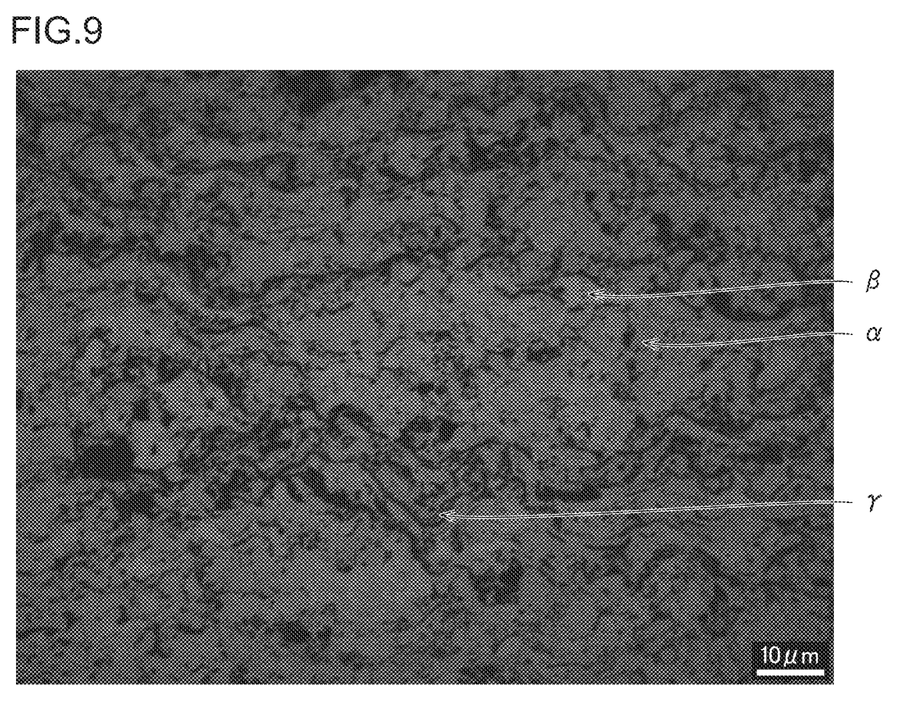
FIG. 9 is an optical micrograph of a cross section perpendicular to the surface of the coating.

FIG. 9 is an optical micrograph of a cross section perpendicular to the surface of the coating of Example B. Referring to FIG. 9, in the coating, the chromium carbide phase α is formed with closely stacked chromium carbide grains, with the nickel-based alloy phase β and the oxide phase γ filling the interstices in the chromium carbide phase α.

This is because, with thermal spraying, the chromium carbide grains included in the spraying powder are deposited on the surface of the base member while maintaining their shapes to constitute the chromium carbide phase, and when the softened nickel-based alloy is to fill the interstices in the chromium carbide phase, a part of the nickel-based alloy reacts with oxygen to form the oxide phase. The coating having such a structure becomes excellent in wear resistance and corrosion resistance, and also excellent in durability against hits of hard objects.

Example 2

A sample was produced by forming a coating in a similar manner as in the production method described in the above embodiment, and an experiment was conducted on the sample to confirm its corrosion resistance. Specifically, thermal spraying was performed under the similar conditions as in Example B of Example 1 above to form a coating, and a copper-accelerated acetic acid salt spray test (CASS test) was conducted to examine the time taken for rust to appear (rust generation time) (Example). For comparison, the CASS test was also conducted on chromium plating (with the coating thickness of 40 μm) (Comparative Example). The examination results are shown in Table 2.

TABLE 2

|  | Rust Generation Time (hr) |
| --- | --- |
| Example | 324 or more |
| Comparative Example | 50 |

Referring to Table 2, on the sample of the Comparative Example, rust appeared after a lapse of 50 hours. On the sample of the Example, no rust appeared even after a lapse of 324 hours. The rust generation time in the Example is at least sixfold that of the Comparative Example.

From this, it is confirmed that the coating formed on the cylinder rod according to the present invention is not only excellent in wear resistance and in durability against hits of hard objects, but also considerably superior in terms of corrosion resistance compared to chromium plating.

Example 3

An experiment was conducted to confirm the durability of the coating in the case of changing the composition of the nickel-based alloy phase constituting the coating. Specifically, in a similar method as in Example 2 above, the nickel-based alloy was changed to one containing not less than 20% by mass and not more than 23% by mass of chromium and not less than 8% by mass and not more than 10% by mass of molybdenum, and further containing not less than 3% by mass and not more than 4.5% by mass in total of at least one of niobium and tantalum, and not more than 5% by mass of iron, with the remainder consisting of nickel and unavoidable impurities. The hardness of the coating was measured, and the CASS test was conducted under the similar conditions as in Example 2.

As a result, the hardness of the coating was comparable to that in Example 1. For the sample of the present example as well, no rust appeared after a lapse of 324 hours. From this, it has been confirmed that a coating having comparable durability can be obtained even when the composition of the nickel-based alloy phase is changed.

It should be understood that the embodiment and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The cylinder rod of the present invention is applicable particularly advantageously to the cylinder rod that is used in an environment where wear resistance and corrosion resistance are required and where there also are risks of being hit by hard objects.

DESCRIPTION OF REFERENCE NUMERALS

1: hydraulic cylinder; 10: cylinder; 11: body portion; 11A: inner peripheral surface; 12: first oil passage; 13: first oil inlet; 14: second oil inlet; 15: second oil passage; 16: cylinder bottom; 16A: connection hole; 17: cylinder head; 17A: inner peripheral surface; 20: cylinder rod; 21: body portion; 21A: outer peripheral surface; 22: piston holding section; 22A: outer peripheral surface; 23: screw portion; 23A: outer peripheral surface; 24: piston; 24A: outer peripheral surface; 24B: inner peripheral surface; 25: nut; 26: joint portion; 27: head portion; 27A: connection hole; 31: first oil chamber; 32: second oil chamber; 91: base portion; 91A: outer peripheral surface; and 92: coating.

The invention claimed is:

1. A cylinder rod of a hydraulic cylinder, comprising:
a body portion having a bar shape; and
a head portion arranged at a longitudinal end of the body portion;
the body portion having a coating formed on an outer peripheral surface thereof,
the coating including, in terms of area ratio in cross section, not less than 56.1% and not more than 84.4% of a chromium carbide phase, with the remainder consisting of a nickel-based alloy phase and an oxide phase, and
the nickel-based alloy phase is comprised of a nickel-based alloy selected from the group consisting of:
   (a) a nickel-based alloy that contains not less than 26% by mass and not more than 30% by mass of molybdenum and not less than 2% by mass and not more than 8% by mass of iron, with a remainder consisting of nickel and unavoidable impurities;
   (b) a nickel-based alloy that contains not less than 13% by mass and not more than 20% by mass of molybdenum, not less than 13% by mass and not more than 18% by mass of chromium, not less than 2% by mass and not more than 8% by mass of iron, and not less than 2% by mass and not more than 5% by mass of tungsten, with a remainder consisting of nickel and unavoidable impurities;
   (c) a nickel-based alloy that contains not less than 20% by mass and not more than 23% by mass of chromium and not less than 8% by mass and not more than 10% by mass of molybdenum, with a remainder consisting of nickel and unavoidable impurities; and
   (d) a nickel-based alloy that contains not less than 20% by mass and not more than 23% by mass of chromium and not less than 8% by mass and not more than 10% by mass of molybdenum, and further contains not less than 3% by mass and not more than 4.5% by mass in total of at least one of niobium and tantalum, and not more than 5% by mass of iron, with a remainder consisting of nickel and unavoidable impurities.

2. The cylinder rod according to claim 1, wherein the area ratio of the chromium carbide phase is from 61.7% to not more than 84.4%.

3. The cylinder rod according to claim 1, wherein
the chromium carbide phase is formed with stacked chromium carbide grains, and
the nickel-based alloy phase and the oxide phase fill interstices in the chromium carbide phase.

* * * * *